US012558286B2

(12) United States Patent
Wang et al.

(10) Patent No.: US 12,558,286 B2
(45) Date of Patent: Feb. 24, 2026

(54) KNEE JOINT MECHANISM

(71) Applicant: SHANGHAI FOURIER INTELLIGENCE CO., LTD, Shanghai (CN)

(72) Inventors: Jun Wang, Huai'an (CN); Xingguang Zhang, Wuhu (CN); Danping Xiao, Nankang (CN); Kai Dong, Luan (CN); Jie Gu, Shanghai (CN)

(73) Assignee: SHANGHAI FOURIER INTELLIGENCE CO., LTD, Shanghai (CN)

( * ) Notice: Subject to any disclaimer, the term of this patent is extended or adjusted under 35 U.S.C. 154(b) by 686 days.

(21) Appl. No.: 17/923,538

(22) PCT Filed: Mar. 19, 2021

(86) PCT No.: PCT/CN2021/081744
§ 371 (c)(1),
(2) Date: Nov. 4, 2022

(87) PCT Pub. No.: WO2021/248968
PCT Pub. Date: Dec. 16, 2021

(65) Prior Publication Data

US 2023/0181409 A1 Jun. 15, 2023

(30) Foreign Application Priority Data

Jun. 12, 2020 (CN) ........................ 202010532163.X

(51) Int. Cl.
*A61H 3/00* (2006.01)

(52) U.S. Cl.
CPC ....... *A61H 3/008* (2013.01); *A61H 2003/007* (2013.01)

(58) Field of Classification Search
CPC .... A61H 3/00; A61H 2205/102; A61H 1/024; A61H 1/02; A61H 1/0262;
(Continued)

(56) References Cited

U.S. PATENT DOCUMENTS 4,489,718 A 12/1984 Martin
5,399,154 A 3/1995 Kipnis et al.
(Continued)

FOREIGN PATENT DOCUMENTS

CN 85107981 A 7/1986
CN 2829697 Y 10/2006
(Continued)

OTHER PUBLICATIONS

CN 203400232 U machine translation (Year: 2014).*
(Continued)

*Primary Examiner* — Brandy S Lee
*Assistant Examiner* — Sara K Toich
(74) *Attorney, Agent, or Firm* — HAUPTMAN HAM, LLP

(57) ABSTRACT

A knee joint mechanism includes a thigh support assembly, a connecting base, a shank support assembly and a locking mechanism. The thigh support assembly is fixed at a thigh of an exoskeleton robot, a first angle sensor is disposed on a hip, and power is provided from the hip. The connecting base is mounted with a second angle sensor. The locking mechanism includes a motor, a worm gear assembly, a locking member, an unlocking member, and a first limiting member. The unlocking member and the first limiting member firmly fix the locking member to maintain the thigh support assembly, the connecting base and the shank support assembly at an ergonomic angle. The motor drives the unlocking member to rotate through the worm gear assem-
(Continued)

bly to realize unlocking. The second angle sensor controls the unlocking member to lock the locking block.

9 Claims, 3 Drawing Sheets

(58) Field of Classification Search
CPC ........ A61H 2201/5069; A61H 2201/14; A61H 2201/1418; A61H 2201/1445; A61F 5/0123; A61F 2005/0158; B25J 9/0006
See application file for complete search history.

(56) References Cited

U.S. PATENT DOCUMENTS

| | | | | |
|---|---|---|---|---|
| 5,921,946 | A | 7/1999 | Tillinghast et al. | |
| 10,682,249 | B2 * | 6/2020 | Kazerooni | A61H 1/0244 |
| 2002/0169402 | A1 * | 11/2002 | Hatton | A61F 5/0125 602/26 |
| 2003/0093018 | A1 * | 5/2003 | Albrecht | A61F 5/013 602/16 |
| 2004/0049140 | A1 | 3/2004 | Doty et al. | |
| 2009/0171469 | A1 | 7/2009 | Thorsteinsson et al. | |
| 2010/0125229 | A1 | 5/2010 | Rudolph et al. | |
| 2015/0231018 | A1 * | 8/2015 | Shim | A61H 1/024 623/24 |

FOREIGN PATENT DOCUMENTS

| | | | | | |
|---|---|---|---|---|---|
| CN | 102574285 | A | | 7/2012 | |
| CN | 102762171 | A | | 10/2012 | |
| CN | 102973337 | A | | 3/2013 | |
| CN | 103260576 | A | | 8/2013 | |
| CN | 203400232 | U | * | 1/2014 | |
| CN | 104490568 | A | | 4/2015 | |
| CN | 104822346 | A | | 8/2015 | |
| CN | 105326627 | A | | 2/2016 | |
| CN | 108652634 | A | | 10/2018 | |
| CN | 208447860 | U | | 2/2019 | |
| DE | 19904554 | A1 | * | 8/2000 | A61F 5/0125 |
| EP | 3357474 | A1 | | 8/2018 | |
| EP | 3466395 | A1 | | 4/2019 | |
| WO | 2004024040 | A2 | | 3/2004 | |

OTHER PUBLICATIONS

DE-19904554-A1 machine translation (Year: 2000).*
The first office action issued in corresponding CN application No. 202010532163.X dated Jul. 23, 2020.
The second office action issued in corresponding CN application No. 202010532163.X dated Aug. 10, 2020.
WIPO, International Search Report and Written Opinion for International Application No. PCT/CN2021/081744, May 27, 2021.
Extended European search report issued in corresponding European application No. 21822054.9 dated Apr. 11, 2024.

* cited by examiner

KNEE JOINT MECHANISM

FIELD OF TECHNOLOGY

The present invention relates to the technical field of rehabilitation walking aids, in particular to a knee joint mechanism.

BACKGROUND

In the technical field of rehabilitation walking aids, certain existing knee joint mechanisms are driven by motors and harmonic reducers. Referring to patent application publication number CN110123589A, a lightweight wearable lower limb rehabilitation walking-aiding exoskeleton for hemiplegic patients is provided, wherein a knee joint driving mechanism comprises a second limiting end cap, a second flexible flange, a second coupling, a second rigid wheel flange, a second harmonic reducer, a second motor flange and a second motor; and the knee joint driving mechanism requires two knee joint driving mechanisms, one on the left and one on the right, which is costly, and the weight and size of the exoskeleton machine are increased. It requires a continuous power supply to the two knee joint driving mechanisms during use, which results in high energy consumption, and generally requires high-capacity batteries. In addition, the use of high-capacity batteries also brings about an increase in cost and weight.

In addition, certain knee joints are rotated by hydraulic cylinders. Referring to patent application publication number CN110465924A, a lower limb exoskeleton robot with a four-bar-linkage knee joint is provided, wherein a keen joint comprises an upper knee joint support block and a lower knee joint support block, which are connected into a four-bar-linkage structure through a first knee joint swinging plate and a second knee joint swinging plate, and a movement of the lower knee joint support block is driven through a hydraulic cylinder, which results in a greater overall size and weight and higher cost.

A way to achieve the rotation of the knee joint through the Bowden cable is further provided. Referring to patent application publication number CN110193819A, an adaptive knee joint mechanism and device for wearable exoskeleton is provided, wherein the knee joint mechanism comprises a thigh rod, a shank rod, a flexible knee joint, a knee Bowden cable, a knee Bowden cable winding cylinder and a knee joint driving motor. The overall structure is complex, the energy consumption generated during use is high, and the Bowden cable is at risk of fracture over time.

A knee joint is further provided. Referring to patent application publication number CN110744526A, a driven type lower limb motion force assisting exoskeleton device is provided, which stores and releases energy by a torsion spring to achieve an effect of buffering and saving labor. Although the device is small in size and light in weight, the weight-bearing support effect is poor during the patient's walking. In the process of standing or walking, when the whole leg of the exoskeleton is stressed, its knee joint is not completely locked, and can still rotate along the axial direction. If the patient's leg is weak or inadvertent, it is easy to lose control of support and fall, resulting in secondary injury.

SUMMARY

In order to overcome the defects of the prior art, the present invention provides a knee joint mechanism, wherein power is supplied by a hip of an exoskeleton robot, a first angle sensor or a second angle sensor controls a drive assembly to drive an unlocking member to make a locking member unlocked or locked, and a shank drives the locking member to rotate or form support through a shank support assembly under the action of gravity, thus avoiding setting a power source at the knee joint. The overall structure is light, the size is small, and the battery life is long, which can effectively improve the practicability of the exoskeleton rehabilitation robot.

The technical solution for realizing the above purpose is as follows:

the present invention provides a knee joint mechanism, which comprises:

a thigh support assembly fixed at a thigh of an exoskeleton robot, with an end of the thigh support assembly that is close to a hip of the exoskeleton robot being mounted with a first angle sensor;

a shank support assembly fixed at a shank of the exoskeleton robot;

a connecting base located at a knee joint side of the exoskeleton robot, an upper part of the connecting base being fixedly connected to the thigh support assembly, a lower part of the connecting base being rotationally connected to the shank support assembly, and the connecting base being mounted with a second angle sensor; and a locking mechanism mounted on the connecting base and comprising a locking member, an unlocking member, a first limiting member and a drive assembly, wherein the locking member is locked between the unlocking member and the first limiting member, the shank support assembly is connected to the locking member, the drive assembly is connected to the unlocking member, and the drive assembly is triggered by the first angle sensor and the second angle sensor; after the first angle sensor senses a rotation of the hip, the drive assembly controls the unlocking member away from the locking member, to unlock the locking member, which is convenient for human body to bend knees and swing in a certain range; when the human leg finishes swinging before landing, the second angle sensor senses that the thigh support assembly, the connecting base and the shank support assembly form a predetermined ergonomic angle, the drive assembly controls the unlocking member to approach the locking member to realize locking while achieving an effect in supporting the weight of a human body.

further, the locking member comprises a locking cam attached to a rear side of the connecting base and a first rotating shaft rotationally disposed in the connecting base and is fixedly connected to the locking cam; and the locking cam is provided with a locking block movably inserted between the unlocking member and the first limiting member, and the connecting base is provided with a first bearing sleeved on the first rotating shaft, so that the rotation of the first rotating shaft is allowed to be more flexible by the first bearing, which is convenient for patients to bend knees and swing.

Further, the locking block is provided with an arc-shaped surface or an inclined surface at a side that is close to the unlocking member, which makes the structure between the locking block and the unlocking member more compact to achieve a space-saving effect while the unlocking member effectively controls the locking member.

Further, a lower end of the locking cam is provided with a U-shaped groove in which the shank support assembly is positioned and is fixedly mounted on the first rotating shaft, to lock and fix the shank support assembly on the first rotating shaft, and then the U-shaped groove ensures that the shank support assembly does not rotate relatively on the locking cam, so that the connection between the shank support assembly and the connecting base is more stable, the structure is more compact and space-saving.

Further, the unlocking member comprises an unlocking block attached to the rear side of the connecting base and a second rotating shaft rotationally disposed in the connecting base and fixedly connected to the unlocking block; and the unlocking block is fitted with the locking member, the connecting base is provided with a second bearing sleeved on the second rotating shaft, the second rotating shaft is connected to the drive assembly after passing through the connecting base, and the drive assembly drives the second rotating shaft to rotate in the second bearing, so that the rotation of the second rotating shaft is more flexible.

Further, the drive assembly comprises a worm gear assembly, a third rotating shaft and a motor, wherein the worm gear assembly comprises a worm wheel and a worm gear which are fitted with each other;

the worm wheel is coaxially and fixedly connected to an end of the second rotating shaft, a fixation bracket is mounted on the front side of the connecting base, and the third rotating shaft is rotationally mounted in the fixation bracket; and the worm gear is sleeved on the third rotating shaft, a lower end of the fixation bracket is provided with a counterbore in which the motor is mounted, and the rotating shaft of the motor is coaxially and fixedly connected to the third rotating shaft.

Further, the rear side of the connecting base is also fixedly provided with a second limiting member for limiting a rotation range of the unlocking member, the second limiting member is located at one side of the unlocking member that is away from a rotation direction of the locking member, so as to prevent a failure in a process of the motor driving the second rotating shaft and the unlocking member to rotate through the worm gear assembly, resulting in the locking member rotating too far to go beyond a control range of the unlocking member.

Further, the rear side of the connecting base is provided with a profiling groove for mounting the thigh support assembly, which ensures that the thigh support assembly is firmly connected to the connecting base and avoids a relative rotation of the thigh support assembly on the connecting base.

Further, the rear side of the connecting base is mounted with a back cover, which is close to an upper end of the connecting base and fitted with the locking member to form a seal for protecting various parts mounted on the rear side of the connecting base while improving the aesthetic value.

Further, the front side of the connecting base is mounted with a front cover, and the second angle sensor is mounted on the inner side of the front cover, which is used for protecting various parts mounted on the front side of the connecting base while improving the aesthetic value.

Beneficial effects: the differences between the prior art and the present invention are that, the knee joint mechanism provided by the present invention comprises a thigh support assembly, a connecting base, a shank support assembly and a locking mechanism; the thigh support assembly is fixed at a thigh of an exoskeleton robot, and a first angle sensor is disposed on a hip, the connecting base is mounted with a second angle sensor, the locking mechanism includes a motor, a worm gear assembly, a locking member fixedly connected to the shank support assembly, an unlocking member and a first limiting member for limiting a rotation range of the locking member; when the mechanism supports the human body to bear weight, the unlocking member and the first limiting member firmly fix the locking member, so that the thigh support assembly, the connecting base and the shank support assembly are maintained at an ergonomic angle to support the weight of human body; through a worm gear assembly and a motor self-locking unlocking member, a good weight-bearing support effect is achieved; when the exoskeleton robot drives the thigh support assembly to rotate through the hip, the first angle sensor controls the rotation of the motor, and then the unlocking member is driven to rotate by the worm gear assembly, realizing the unlocking of the shank support assembly; hip power drives thigh to swing upward, and the thigh drives the shank to swing upward; after the thigh swings up to the limit, it starts swinging down, while the shank still has an upward trend under the action of inertia, and then begins to swing down; in a certain state before the shank lands, the thigh support assembly, the connecting base and the shank support assembly once again form the previous ergonomic angle, and the second angle sensor then controls the unlocking member to fix and lock the locking block; at this time, the locking block achieves the supporting effect again, so that the cycle repeats; the knee joint mechanism does not provide a power source at the knee joint, so that after being driven at the hip, the motor at the knee joint is controlled to unlock or lock correspondingly only by the angle sensor at the hip or knee joint, which achieves a good control effect. In addition, the overall structure is simpler and lighter, the volume is smaller, the energy consumption is low and the battery life is prolonged, which can effectively reduce the cost and improve the practicability of exoskeleton rehabilitation devices.

Figure 1:
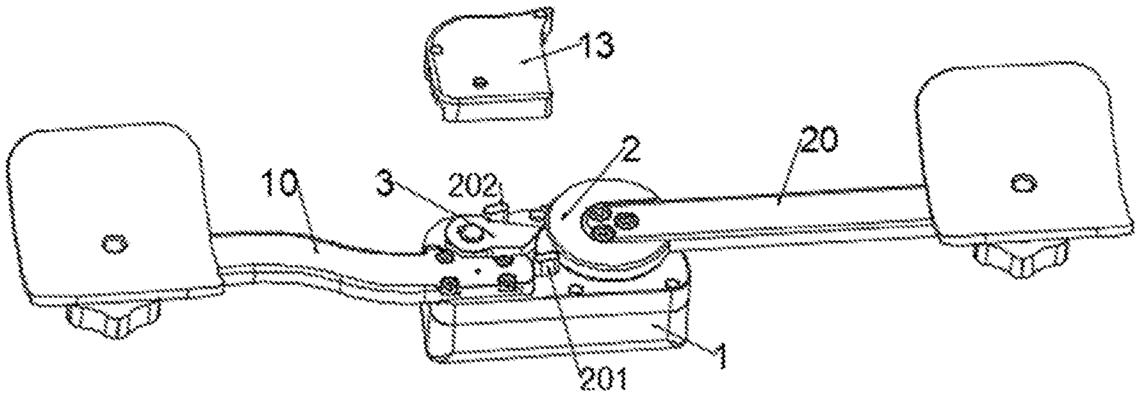
FIG. 1 is a structural schematic diagram of a knee joint mechanism according to a preferred embodiment of the present application.

Reference signs: 10—thigh support assembly, 20—shank support assembly, 1—connecting base, 11—second angle sensor, 12—profiling groove, 13—rear cover, 14—front cover, 2—locking member, 21—locking cam, 211—locking block, 212—U-shaped groove, 22—first rotating shaft, 23—first bearing, 231—constant section ring, 232—clamp spring, 3—unlocking member, 31—unlocking block, 32—second rotating shaft, 33—second bearing, 4—motor, 41—motor rotating shaft, 5—fixation bracket, 51—worm wheel, 52—worm gear, 53—third rotating shaft, 54—counterbore, 201—first limiting member, 202—second limiting member.

DETAILED DESCRIPTION OF THE EMBODIMENTS

The present invention is further explained below with reference to the accompanying drawings and specific embodiments.

Referring to FIGS. 1 to 5, the present invention provides a knee joint mechanism, which comprises:

- a thigh support assembly 10, of which an upper part is fixed at a thigh of an exoskeleton robot, with power being provided through a hip of the exoskeleton robot, and a first angle sensor being mounted at an end of the thigh support assembly 10 that is close to the hip;
- a shank support assembly 20, which is fixed at a shank of the exoskeleton robot;
- a connecting base 1, which is located at a knee joint side of the exoskeleton robot, with an upper part of the connecting base 1 being fixedly connected to the thigh support assembly 10, a lower part of the connecting base 1 being rotationally connected to the shank support assembly 20, and the connecting base 1 being mounted with a second angle sensor 11; and
- a locking mechanism, which is mounted on the connecting base 1 and comprises a locking member 2, an unlocking member 3, a first limiting member 201 and a drive assembly, wherein the locking member 2 is locked between the unlocking member 3 and the first limiting member 201, the shank support assembly 20 is connected to the locking member 2; after being locked, the thigh support assembly 10, the connecting base 1 and the shank support assembly 20 form a predetermined ergonomic angle, which is generally 180°, to form a support; the drive assembly is connected to the unlocking member 3 and triggered by the first angle sensor and the second angle sensor 11. In the use of patient leg exoskeleton robot, generally, power sources are installed at hips and knees respectively, so as to control the swing of hip and knee joint respectively. In the present invention, the power source at the knee joint is omitted; after sensing the rotation of the hip, the first angle sensor of the hip directly controls the motor 4 to rotate to make the unlocking member 3 away from the locking member 2 to realize the unlocking of the locking member; the locking member 2 can rotate in a certain range, and the shank support assembly 20 drives the locking member 2 to rotate synchronously in the same direction under the action of gravity, which is convenient for the human body to bend knees and swing in a certain range; hip power drives the thigh to swing upward, and the thigh drives the shank to swing upward; after the thigh swings up to the limit, it starts swinging down, however, the shank still has an upward trend under the action of inertia, and then begins to swing down; in a certain state before the shank lands, the second angle sensor 11 senses that the thigh support assembly 10, the connecting base 1 and the shank support assembly 20 form a predetermined ergonomic angle, and then controls the motor 4 to rotate in a reverse direction to realize the locking of the locking member; at this time, the unlocking mechanism achieves an effect in supporting the weight of the human body, and the other leg can be bent and swung by taking this leg as the support.

According to the motion simulation experiment, before the shank lands, the thigh support assembly, the connecting base and the shank support assembly will reach the predetermined ergonomic angle, i.e., 180°, so as to realize the locking of the locking member and achieve a supporting effect.

Preferably, the locking member 2 comprises a locking cam 21 and a first rotating shaft 22, wherein the locking cam 21 is attached to the rear side of the connecting base 1, and the first rotating shaft 22 is rotationally disposed in the connecting base 1 and fixedly connected to the locking cam 21; and

- the locking cam 21 is provided with a locking block 211 movably inserted between the unlocking member 3 and the first limiting member 201, and the connecting base 1 is provided with a first bearing 23 sleeved on the first rotating shaft 22. First, the first bearing 23 is pressed into a shaft hole of the connecting base 1, and pressed in a constant section ring 231 for preventing disengagement; then the first rotating shaft 22 is pressed in an inner ring of the first bearing 23 to a predetermined position, an end of the first rotating shaft 22 that is away from the cam 21 is provided with a clamping groove, and a clamping spring 232 is locked in on the clamping groove for preventing disengagement; through the first bearing 23, a rotation of the first rotating shaft 22 is more flexible, which facilitates patients to bend knees and swing.

Preferably, a side of the locking block 211 that is close to the unlocking member 3 is provided with an arc-shaped surface, a side of the unlocking member 3 that is close to the locking block 211 is also provided with an arc-shaped surface, so as to fit with each other; the locking block 211 and the unlocking member 3 are fitted with each other by the arc-shaped surfaces, while the unlocking member 3 effectively controls the locking member 2, making the structure more compact and space-saving. Obviously, those skilled in the art can easily envisage that the arc-shaped surface can also be replaced with an inclined surface or other non-standard surface, which is not limited in detail here and falls within the protection scope of the present invention.

Preferably, a lower end of the locking cam 21 is provided with a U-shaped groove 212 in which the shank support assembly 20 is disposed and is fixedly mounted on the first rotating shaft 22, to lock and fix the shank support assembly 20 on the first rotating shaft 22, and then the U-shaped groove 212 ensures that the shank support assembly 20 does not rotate relatively on the locking cam 21, so that the connection between the shank support assembly 20 and the connecting base 1 is more stable, and the structure is more compact and space-saving.

Preferably, the unlocking member 3 comprises an unlocking block 31 attached to the rear side of the connecting base 1 and a second rotating shaft 32 rotationally disposed in the connecting base 1 and fixedly connected to the unlocking block 31; and

- the unlocking block 31 is fitted with the locking member 2, and the connecting base 1 is provided with a second bearing 33 sleeved on the second rotating shaft 32; the second rotating shaft 32 is connected to the drive assembly after passing through the connecting base 1, and the drive assembly drives the second rotating shaft 32 to rotate in the second bearing 33, so that a rotation of the second rotating shaft 32 is more flexible.

Preferably, the drive assembly comprises a worm gear assembly, a third rotating shaft 53 and a motor 4, wherein the worm gear assembly comprises a worm wheel 51 and a worm gear 52 which are fitted with each other;

- the worm wheel 51 is coaxially and fixedly connected to an end of the second rotating shaft 32, a fixation bracket 5 is mounted on the front side of the connecting base 1, and the third rotating shaft 53 is rotationally mounted in the fixation bracket 5; and
- the worm gear 52 is sleeved on the third rotating shaft 53, a lower end of the fixation bracket 5 is provided with a counterbore 54 in which the motor 4 is mounted, and a motor rotating shaft 41 of the motor 4 is coaxially and fixedly connected to the third rotating shaft 53; the motor 4 drives the third rotating shaft 53 to rotate through the motor rotating shaft 41, and the third rotating shaft 53 drives the worm wheel 51 to rotate through the worm gear 52, thus driving the unlocking block 31 to rotate through the second rotating shaft 32.

Preferably, the rear side of the connecting base 1 is also fixedly provided with a second limiting member 202 for limiting a rotation range of the unlocking member 3; the second limiting member 202 is located at one side of the unlocking member 3 that is away from a rotation direction of the locking member 2, so as to prevent a failure in a process of the motor 4 driving the second rotating shaft 32 and the unlocking member 3 to rotate through the worm gear assembly, resulting in the locking member 2 rotating too far to go beyond a control range of the unlocking member 3, which can also shorten a reset rotation stroke of the unlocking member 3 and improve the response speed of the locking action of the locking member.

Preferably, the rear side of the connecting base 1 is provided with a profiling groove 12 for mounting the thigh support assembly 10, which ensures that the thigh support assembly 10 is firmly connected to the connecting base 1 and avoids a relative rotation of the thigh support assembly 10 on the connecting base 1.

Preferably, the rear side of the connecting base 1 is mounted with a back cover 13, which is close to an upper end of the connecting base 1 and fitted with the locking member 2 to form a seal for protecting various parts mounted on the rear side of the connecting base 1 while improving the aesthetic value.

Preferably, the front side of the connecting base 1 is mounted with a front cover 14, and the second angle sensor 11 is mounted on the inner side of the front cover 14, which is used for protecting various parts mounted on the front side of the connecting base 1 while improving the aesthetic value.

Specifically, after a patient wears the exoskeleton robot on the injured leg, the knee joint mechanism is correspondingly fixed at the thigh, shank and knee joint of the exoskeleton robot, when the legs are in a standing position, the locking member 2 is closely attached to the first limiting member 201, and the unlocking member 3 is closely attached to the other side of the locking member 2; since the unlocking member 3 is connected to the motor rotating shaft 41 through the worm gear assembly, the good self-locking effect is achieved, and the locking member 2 is locked and fixed under the action of the first limiting member 201 and the unlocking member 3. At this time, the angle between the thigh and shank is locked and fixed through the locking and fixing among the thigh support assembly 10, the connecting base 1 and the shank support assembly 20, thus achieving an effect in supporting the body weight of the patient. When the patient uses one leg as a support to lift the injured leg, power is provided at the hip joint of the leg to rotate the thigh support assembly 10; as the thigh support assembly 10 rotates, the first angle sensor on the thigh support assembly 10 senses an angle change signal and controls the motor 4 to rotate, and the motor rotating shaft 41 drives the unlocking member 3 to rotate away from the locking member 2 through the worm gear to unlock the locking block 211. At this time, the shank support assembly 20 has a certain rotation space between the unlocking member 3 and the first limiting member 201 through the locking member 2, and the patient can complete knee bending and swing. When the patient is powered by the hip joint, before landing the raised thigh and shank again, the patient will first reach the predetermined ergonomic angle. The second angle sensor 11 in the connecting base 1 sends a signal, the unlocking member 3 is controlled to reset and rotate in the direction towards the locking member 2 by the motor 4, and the locking member 2 is driven to closely attached to the first limiting member 201, to complete locking again. At this time, the thigh support assembly 10, the connecting base 1 and the shank support assembly 20 are restored to the original ergonomic angle, to achieve an effect in supporting body weight. At this time, the other leg can be lifted with such the leg as the support. The above cycle completes the walking action and facilitates the patient's lower limb rehabilitation. It is suitable for helping rehabilitation of one leg and helping rehabilitation of both legs at the same time, and its principle of action is the same.

Figure 2:
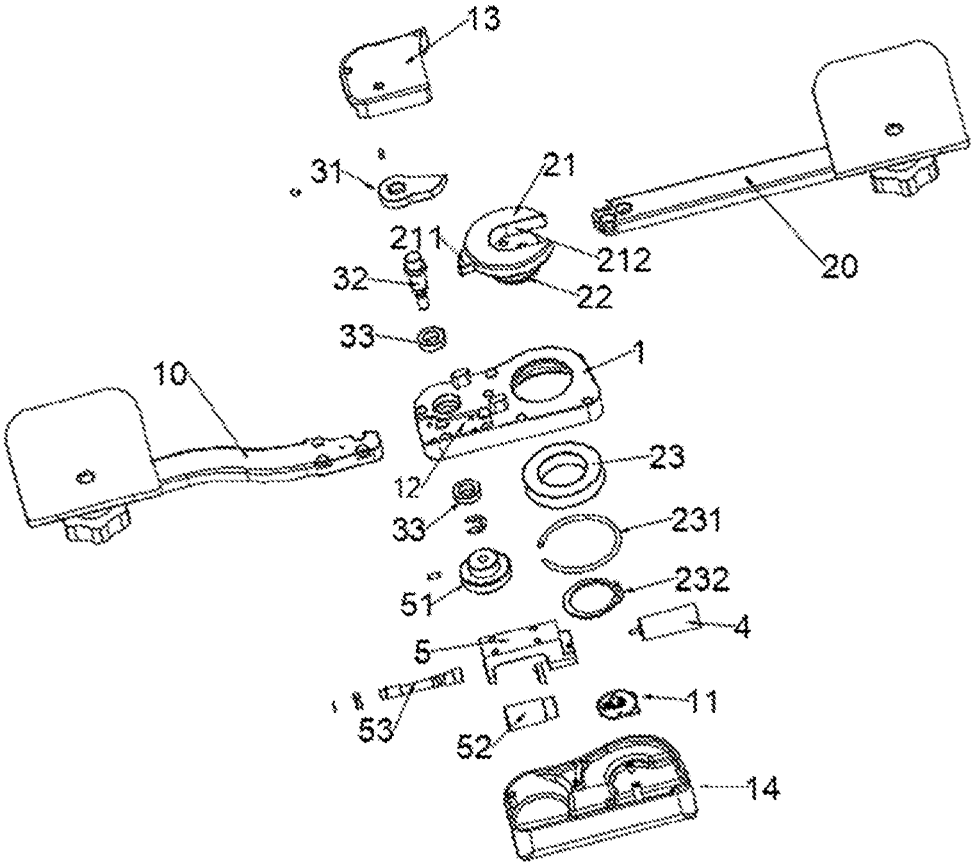
FIG. 2 is an exploded schematic diagram of the knee joint mechanism according to a preferred embodiment of the present application.
Figure 3:
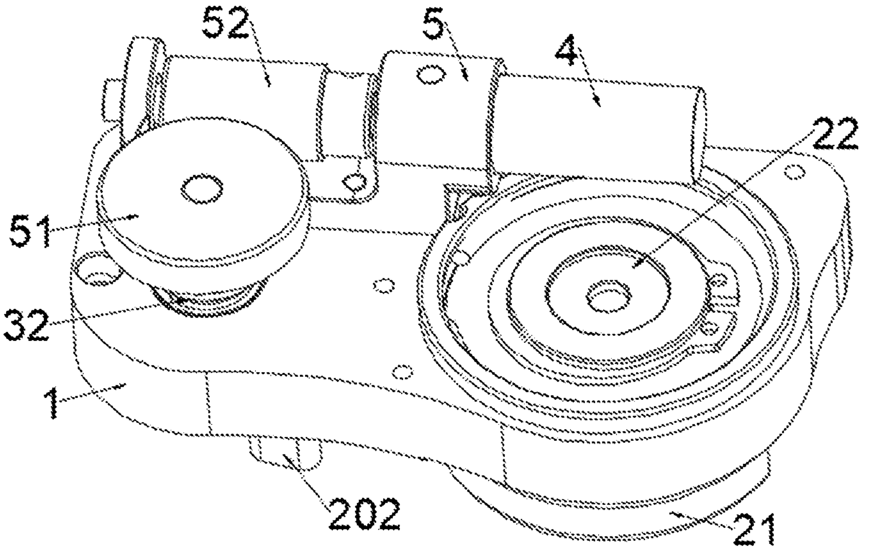
FIG. 3 is a front structure diagram of a connecting base of the present application.
Figure 4:
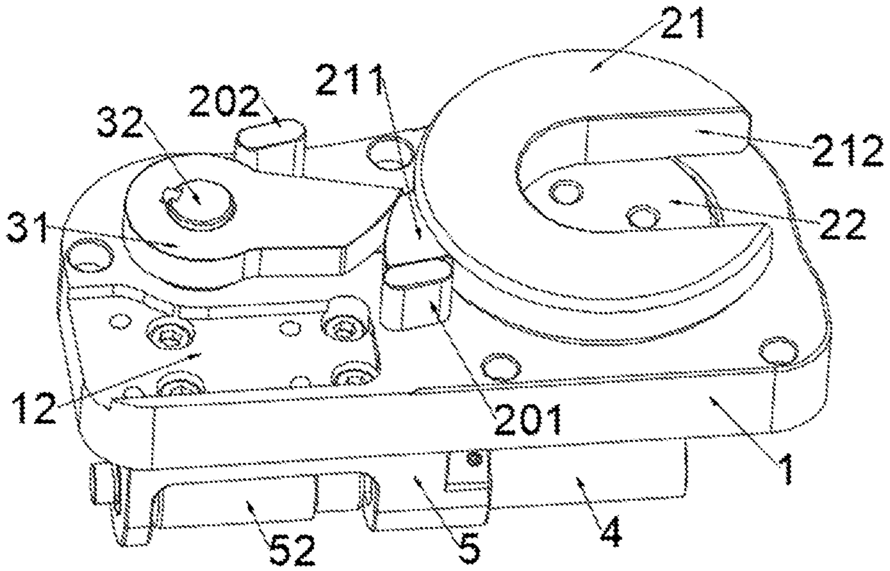
FIG. 4 is a back structure diagram of the connecting base of the present application.
Figure 5:
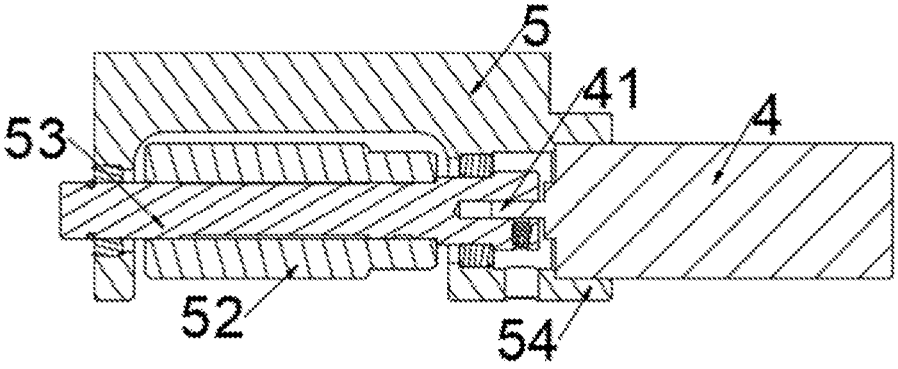
FIG. 5 is a cross-sectional view of a fixation bracket of the present application.

It should be noted that in the drawings, especially FIG. 2, which is the actual exploded diagram of the structure of the present application, some unmarked parts are conventional standard parts such as gaskets and jackscrews commonly used in the installation of mechanical structures, and those skilled in the art can select them appropriately according to the actual installation situation, and no explanation will be given in the embodiments.

The knee joint mechanism herein saves the power source at the knee joint, provides power through the hip, and the angle sensor at the hip or knee joint respectively drives the motor 4 to unlock or lock correspondingly, which achieves a good control effect. In addition, the overall structure is simpler, the volume is smaller, and the weight is lighter, which greatly improves the endurance thereof.

It should be noted that the terms "first, second and third" in the present invention are used for descriptive purposes only, do not indicate any order, cannot be understood as indicating or implying relative importance, and can be interpreted as names of parts.

The above detailed embodiments are only the preferred embodiments of this invention, and not intended to restrict this invention. Any modification, equivalent replacement, improvement, etc. made within the essentials and principles of this invention shall be included in the protection scope of this invention.

What is claimed is:

1. A knee joint mechanism, comprising:

a thigh support assembly fixed at a thigh of an exoskeleton robot, an end of the thigh support assembly that is close to a hip of the exoskeleton robot being mounted with a first angle sensor;

a shank support assembly fixed at a shank of the exoskeleton robot;

a connecting base located at a knee joint side of the exoskeleton robot, an upper part of the connecting base being fixedly connected to the thigh support assembly, a lower part of the connecting base being rotationally connected to the shank support assembly, and the connecting base being mounted with a second angle sensor; and a locking mechanism mounted on the connecting base and comprising a locking member, an unlocking member, a first limiting member and a drive assembly, with the locking member being locked between the unlocking member and the first limiting member, the shank support assembly being connected to the locking member, the drive assembly being connected to the unlocking member, and the drive assembly being triggered by the first angle sensor and the second angle sensor;

further, the unlocking member comprises an unlocking block attached to a rear side of the connecting base and a second rotating shaft rotationally disposed in the connecting base and fixedly connected to the unlocking block; the unlocking block is fitted with the locking member, the connecting base is provided with a second bearing sleeved on the second rotating shaft, and the second rotating shaft is connected to the drive assembly after passing through the connecting base;

the drive assembly comprises a worm gear assembly, a third rotating shaft and a motor, wherein the worm gear assembly comprises a worm wheel and a worm gear which are fitted with each other; the worm wheel is coaxially and fixedly connected to an end of the second rotating shaft, a fixation bracket is mounted on a front side of the connecting base, and the third rotating shaft is rotationally mounted in the fixation bracket; and the worm gear is sleeved on the third rotating shaft, a lower end of the fixation bracket is provided with a counter-bore in which the motor is mounted, and a motor rotating shaft of the motor is coaxially and fixedly connected to the third rotating shaft.

2. The knee joint mechanism of claim 1, wherein the locking member comprises a locking cam attached to the rear side of the connecting base and a first rotating shaft rotationally disposed in the connecting base and is fixedly connected to the locking cam; and the locking cam is provided with a locking block movably inserted between the unlocking member and the first limiting member, and the connecting base is provided with a first bearing sleeved on the first rotating shaft.

3. The knee joint mechanism of claim 2, wherein a side of the locking block that is close to the unlocking member is provided with an arc-shaped surface or an inclined surface.

4. The knee joint mechanism of claim 2, wherein a lower end of the locking cam is provided with a U-shaped groove in which the shank support assembly is disposed and is fixedly mounted on the first rotating shaft.

5. The knee joint mechanism of claim 1, wherein the rear side of the connecting base is further fixedly provided with a second limiting member for limiting a rotation range of the unlocking member, and the second limiting member is arranged at a side of the unlocking member that is away from a rotation direction of the locking member.

6. The knee joint mechanism of claim 1, wherein the rear side of the connecting base is provided with a profiling groove for mounting the thigh support assembly.

7. The knee joint mechanism of claim 1, wherein the rear side of the connecting base is mounted with a back cover, the back cover is close to an upper end of the connecting base and fitted with the locking member to form a seal.

8. The knee joint mechanism of claim 1, wherein the front side of the connecting base is mounted with a front cover, and the second angle sensor is mounted on an inner side of the front cover.

9. The knee joint mechanism of claim 7, wherein the front side of the connecting base is mounted with a front cover, and the second angle sensor is mounted on an inner side of the front cover.

* * * * *